Figure 1:
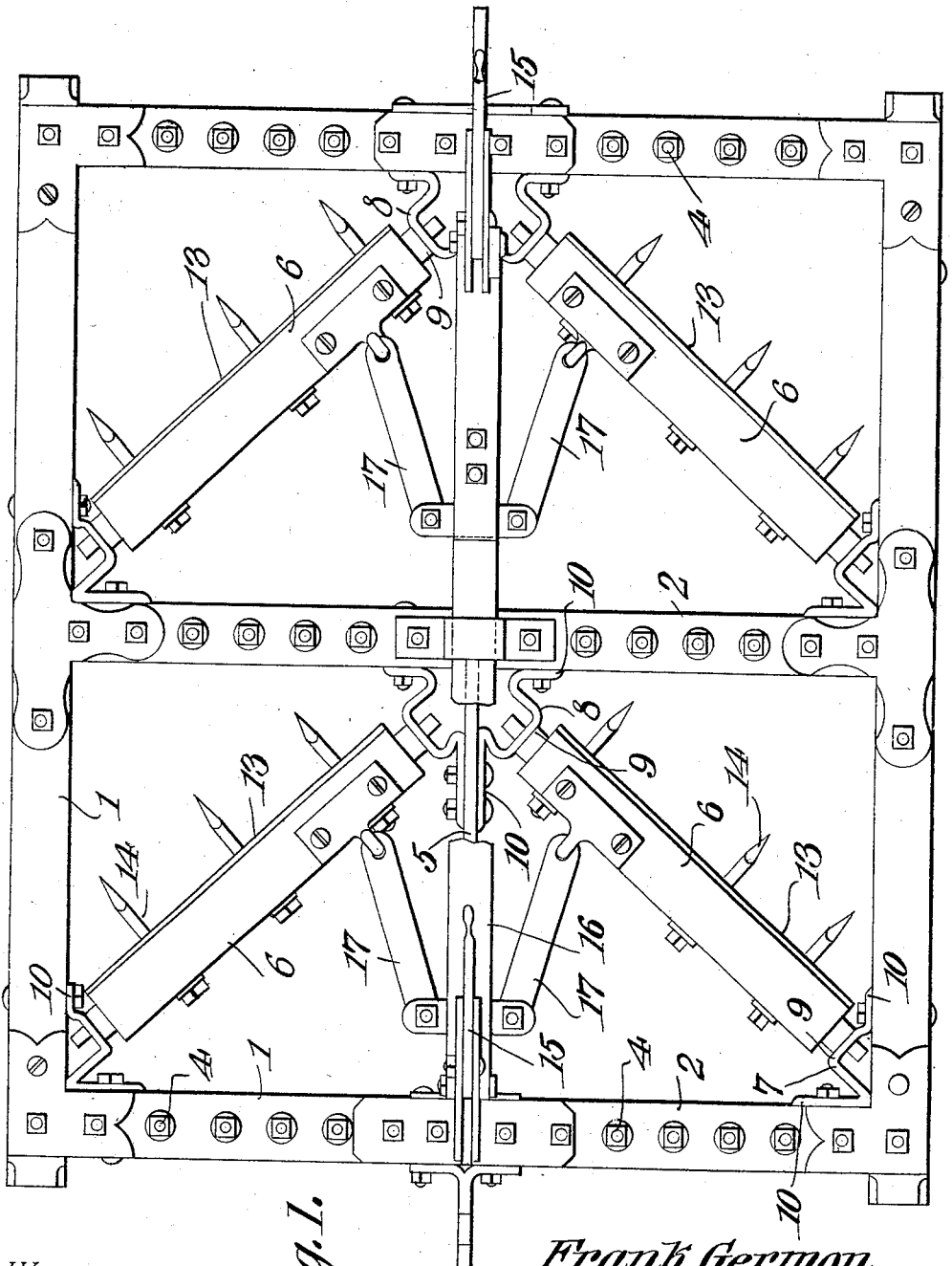

No. 840,839. PATENTED JAN. 8, 1907.
F. GERMON.
HARROW.
APPLICATION FILED SEPT. 28, 1906.

2 SHEETS—SHEET 1.

WITNESSES:

Frank Germon,
INVENTOR.

By C. A. Snow & Co
ATTORNEYS

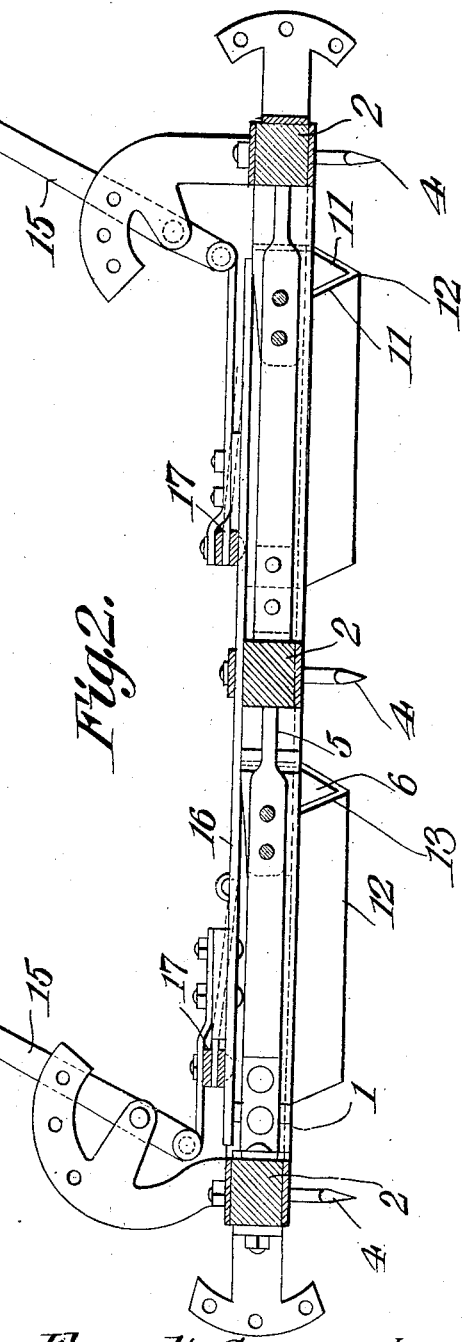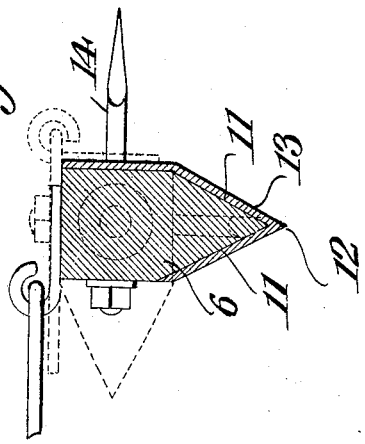

UNITED STATES PATENT OFFICE.

FRANK GERMON, OF LEADVILLE, COLORADO.

HARROW.

No. 840,839.　　　　　Specification of Letters Patent.　　　　　Patented Jan. 8, 1907.

Application filed September 28, 1906. Serial No. 336,607.

*To all whom it may concern:*

Be it known that I, FRANK GERMON, a citizen of the United States, residing at Leadville, in the county of Lake and State of Colorado, have invented a new and useful Harrow, of which the following is a specification.

This invention has relation to harrows, especially of the spike-tooth type; and it consists in the novel construction and arrangement of its parts, as hereinafter shown and described.

The object of the invention is to provide a spike-tooth harrow with a series of shafts diagonally disposed and lever-operated means for turning the same. The said shafts are provided with scraping edges, which are adapted to be simultaneously disposed toward the ground and which when so positioned coöperate with the teeth on the frame of the harrow in loosening the earth and leveling the ground. The said shafts are also provided with teeth, and the shafts may be turned so that the scraping edges thereof will be elevated from the ground and the teeth will be extended toward the ground instead.

In the accompanying drawings, Figure 1 is a top plan view of the harrow. Fig. 2 is a longitudinal sectional view of the same. Fig. 3 is a transverse sectional view of one of the pivoted shafts.

The harrow consists of the frame 1, which is preferably rectangular. The horizontal bars 2 2 of the said frame are provided with spike harrow-teeth 4. The brace 5 extends transversely from the forward bar 2 to the rear bar 2 and is attached to the said bars at the points where it comes in contact with the same. The middle bar 2 and the brace 5 divide the space within the side members of the harrow from one into four compartments. The shafts 6 extend diagonally across the said compartments. The rear ends of the said shafts 6 are journaled in the irons 7, and the forward ends of the said shaft 6 are journaled in the irons 8. The said irons 7 and 8 have the parallel faces 9 and the extended ends 10, which are attached to adjacent portions of the frame 1 of the harrow and constitute corner-braces. The shafts 6 are of the same construction, and a description of one will answer for all. Each said shaft is provided with the converging sides 11 11, which merge into the edge 12. The said edge 12 is located in alinement with the middle transverse axis of the said shaft. The sides 11 11 are covered by suitable metallic plates 13. The spike-teeth 14 extend through the shaft 6, and their longitudinal axes are at right angles to the long transverse axis of the shaft 6. A means is provided for turning all of the shafts 6 simultaneously, so that the scraping edges 12 may be brought into contact with the ground or the ends of the spike-teeth 14 may be so positioned.

The ratchet-levers 15 15 are suitably fulcrumed above the front and rear cross-bar 2. The working ends of the said levers 15 15 are connected together by means of the strip 16. The links 17 are pivotally attached at their inner ends to the strip 16 and are pivotally connected at their outer ends one to each of the shafts 6.

From the foregoing description it is obvious that as the strips 16 are moved longitudinally by means of either one of the levers 15 the outer ends of the links 17 will be drawn together or spread apart and the shafts 6 will be turned. When it is desired to use the implement for the purpose of breaking the ground only, the shafts 6 are turned so that the teeth thereof engage the ground. When, however, it is desired to level the ground, the shafts 6 are turned so that the scraping edges 12 come in contact with the ground. Consequently as the ground is broken by the harrow-teeth carried by the cross-bars 2 2 the said edges 12 spread the earth and level the surface thereof.

Having described my invention, what I claim as new, and desire to secure by Letters Patent, is—

1. A harrow, a shaft located upon the same and having harrow-teeth and a scraping edge, and means for turning said shaft in order to bring either the teeth or the edge in contact with the ground.

2. A harrow, a series of shafts located thereon, each shaft having harrow-teeth and a scraping edge, means for turning said shafts simultaneously to bring either the teeth or the scraping edges thereof in contact with the ground.

3. A harrow, a shaft located diagonally with relation to the same, said shaft having harrow-teeth and a scraping edge and means for turning said shaft.

4. A harrow, a series of shafts located diagonally upon the same, said shafts having harrow-teeth and scraping edges, and means for turning said shafts simultaneously.

5. A harrow, shafts diagonally located upon the same, said shafts having harrow-teeth and scraping edges, means for turning said shafts whereby all of the scraping edges thereof or all of the teeth thereof are brought in contact simultaneously with the ground.

6. A harrow, a shaft located diagonally thereof, corner-strips having ends attached to the frame of the harrow and intermediate parallel sections, the ends of the shaft being journaled in said parallel sections of the strips, said shaft having harrow-teeth and a scraping edge, and means for turning said shaft.

7. A harrow, a shaft journaled thereon, means for turning said shaft, said shaft having teeth attached thereto, and a scraping edge located at right angles to said teeth.

8. A harrow, a shaft journaled thereon, means for turning said shaft, said shaft having converging sides which form a scraping edge, harrow-teeth attached to the shaft and extending at right angles to the long transverse axis of the shaft.

9. A harrow, a shaft journaled thereon, means for turning said shaft, said shaft having a scraping edge located at its central long transverse axis, teeth located upon the shaft and extending at right angles to the long transverse axis thereof.

In testimony that I claim the foregoing as my own I have hereto affixed my signature in the presence of two witnesses.

FRANK GERMON.

Witnesses:
JOHN H. BENSON,
FRANK PURKHART.